US010619809B1

(12) United States Patent
Daghistani

(10) Patent No.: US 10,619,809 B1
(45) Date of Patent: Apr. 14, 2020

(54) SOLAR CHIMNEY STREET LIGHTING POLE

(71) Applicant: King Abdulaziz University, Jeddah (SA)

(72) Inventor: Farouk Fouad Daghistani, Jeddah (SA)

(73) Assignee: King Abdulaziz University, Jeddah (SA)

(*) Notice: Subject to any disclaimer, the term of this patent is extended or adjusted under 35 U.S.C. 154(b) by 0 days.

(21) Appl. No.: 16/151,970

(22) Filed: Oct. 4, 2018

(51) Int. Cl.
| | |
|---|---|
| *F03G 7/00* | (2006.01) |
| *B01D 61/00* | (2006.01) |
| *B01D 61/02* | (2006.01) |
| *F21S 9/03* | (2006.01) |
| *F21S 9/04* | (2006.01) |
| *F21S 8/08* | (2006.01) |
| *F21V 29/83* | (2015.01) |

(Continued)

(52) U.S. Cl.
CPC ............ *F21S 9/035* (2013.01); *B01D 46/448* (2013.01); *F21S 8/086* (2013.01); *F21S 8/088* (2013.01); *F21S 9/04* (2013.01); *F21V 29/71* (2015.01); *F21V 29/83* (2015.01); *F21V 33/00* (2013.01); *F21Y 2115/10* (2016.08)

(58) Field of Classification Search
CPC .... F21S 9/035; F21S 8/088; F21S 9/04; F21S 8/086; F21V 29/71; F21V 33/00; F21V 29/83; B01D 46/448; F21Y 2115/10
See application file for complete search history.

(56) References Cited

U.S. PATENT DOCUMENTS

| | | | | |
|---|---|---|---|---|
| 4,236,507 A | * | 12/1980 | Vincent | F24D 11/007 126/595 |
| 4,346,696 A | * | 8/1982 | Brunet | F24S 10/505 126/705 |

(Continued)

FOREIGN PATENT DOCUMENTS

| | | |
|---|---|---|
| CN | 106195818 A | 12/2016 |
| CN | 206064021 U | 4/2017 |

(Continued)

OTHER PUBLICATIONS

Cao et al. CN201691482 Machine Translation (Year: 2017).*

(Continued)

*Primary Examiner* — Tracie Y Green
(74) *Attorney, Agent, or Firm* — Oblon, McClelland, Maier & Neustadt, L.L.P.

(57) ABSTRACT

A solar chimney street lighting pole having a hollow pole with a first end and a second end, an air inlet circumferentially arranged at the first end and an air outlet arranged at the second end. Dome-like solar heaters are arranged along a length of the hollow pole. The hollow pole is vertically secured relative to the ground with the first end proximal to the ground, and the dome-like solar heaters configured to heat air inside the hollow pole using solar radiation, thereby creating an upward air stream therein. A fan is arranged inside the hollow pole and proximal to the air outlet. A controller is electrically connected to a sensor and a fan actuator to command the fan actuator to switch the fan based on the signal from the sensor. The solar chimney pole transports a polluted air proximal to the ground to the air outlet.

11 Claims, 5 Drawing Sheets

(51) Int. Cl.
*F21V 33/00* (2006.01)
*B01D 46/44* (2006.01)
*F21V 29/71* (2015.01)
*F21Y 115/10* (2016.01)

(56) References Cited

U.S. PATENT DOCUMENTS

| | | | |
|---|---|---|---|
| 9,629,220 B2* | 4/2017 | Panopoulos | F21V 14/02 |
| 2009/0212570 A1* | 8/2009 | Le | F03D 9/007 |
| | | | 290/52 |
| 2012/0020060 A1* | 1/2012 | Myer | F21S 2/00 |
| | | | 362/183 |
| 2012/0143383 A1 | 7/2012 | Cooperrider et al. | |
| 2013/0265786 A1* | 10/2013 | Quinzi | F21S 8/085 |
| | | | 362/431 |
| 2019/0186473 A1* | 6/2019 | Al-Sulaiman | F24S 80/20 |

FOREIGN PATENT DOCUMENTS

| | | |
|---|---|---|
| CN | 206191482 U | 5/2017 |
| KR | 10-1430647 | 8/2014 |
| KR | 10-2018-0015891 | 2/2018 |
| RU | 2528626 C2 * | 9/2014 |

OTHER PUBLICATIONS

RU2528626_machine translation_Sep. 2014 (Year: 2014).*
Tony Thomas Narikulam, "Eco Mushroom: Solar Street Light with Pollution Absorber", Tuvie, May 3, 2018, pp. 1-6, http://www.tuvie.com/eco-mushroom-solar-street-light-with-pollution-absorber/.

* cited by examiner

SOLAR CHIMNEY STREET LIGHTING POLE

BACKGROUND

Field of the Invention

The present disclosure relates generally to air pollution mitigation technology, and particularly to a solar chimney street lighting pole designed to exhaust traffic-related air pollution from the pedestrian's level to an upper level.

Description of the Related Art

Most streets, especially in high-density built environments are highly polluted with dust and traffic exhaust gas that represent a serious health hazard. A recent study indicates that 53,000 early deaths occur per year in the United States alone because of vehicle emissions (Caiazzo, Fabio; Ashok, Akshay; Waitz, Ian A.; Yim, Steve H. L.; Barrett, Steven R. H. (November 2013). "Air pollution and early deaths in the United States. Part I: Quantifying the impact of major sectors in 2005". *Atmospheric Environment*. Elsevier. 79: 198-208). According to another study, traffic fumes alone cause the death of 5,000 people every year just in the United Kingdom (Roland Pease. "Traffic pollution kills 5,000 a year in UK, says study". BBC News).

The concentration of air pollution in the street environment is higher near the ground where the main source of pollution exists (i.e. automobiles) and other sources of particulate matter. Therefore, an exhaust system that guides reaction exhaust gases away from the pedestrian zone would be helpful in improving air quality and saving people's health. Due to good height, location and quantity, street lighting poles are an ideal candidate for such exhaust systems. In addition, street lighting poles don't take up otherwise unused public space.

Accordingly, it is one object of the present disclosure to provide a passive eco-lighting pole, e.g., a solar chimney street lighting pole that mitigates air pollution at street level.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY OF THE INVENTION

In one aspect, the invention includes a solar chimney street lighting pole that functions to mitigate air pollution at a street or pedestrian level using an internal exhaust system that guides away polluted air from near-ground height to a higher atmospheric level.

To passively achieve the above-mentioned function, the disclosed solar chimney street lighting pole is constructed to take advantage of the principle of the greenhouse effect and the chimney updraft effect. The pole has inlets at its base and at least one outlet at its upper end. An updraft air-movement through the pole occurs by convection of air that is heated by passive solar energy. The solar energy is collected by high-impact tinted domes, preferably glass but may be made of other materials including metals, thermoplastics, and thermosets, with high solar absorption properties located at different spots along the pole. When the air inside the pole is heated, it becomes less dense and so it rises in the pole and exits from its top end. This will lower the air pressure in the lower portion of the pole which will pull more air from outside the pole through the inlets at the bottom of the pole. Such passive air movement would guide away polluted air from the near-ground height where pedestrians are to a higher elevation away from pedestrian zones.

By installing many solar chimney street lighting poles, a large-scale air updraft and ventilation will occur, and a new fresh air driven from nearby areas would replace the street level polluted air; hence, people would breathe cleaner air.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features.

DETAILED DESCRIPTION

Figure 1:
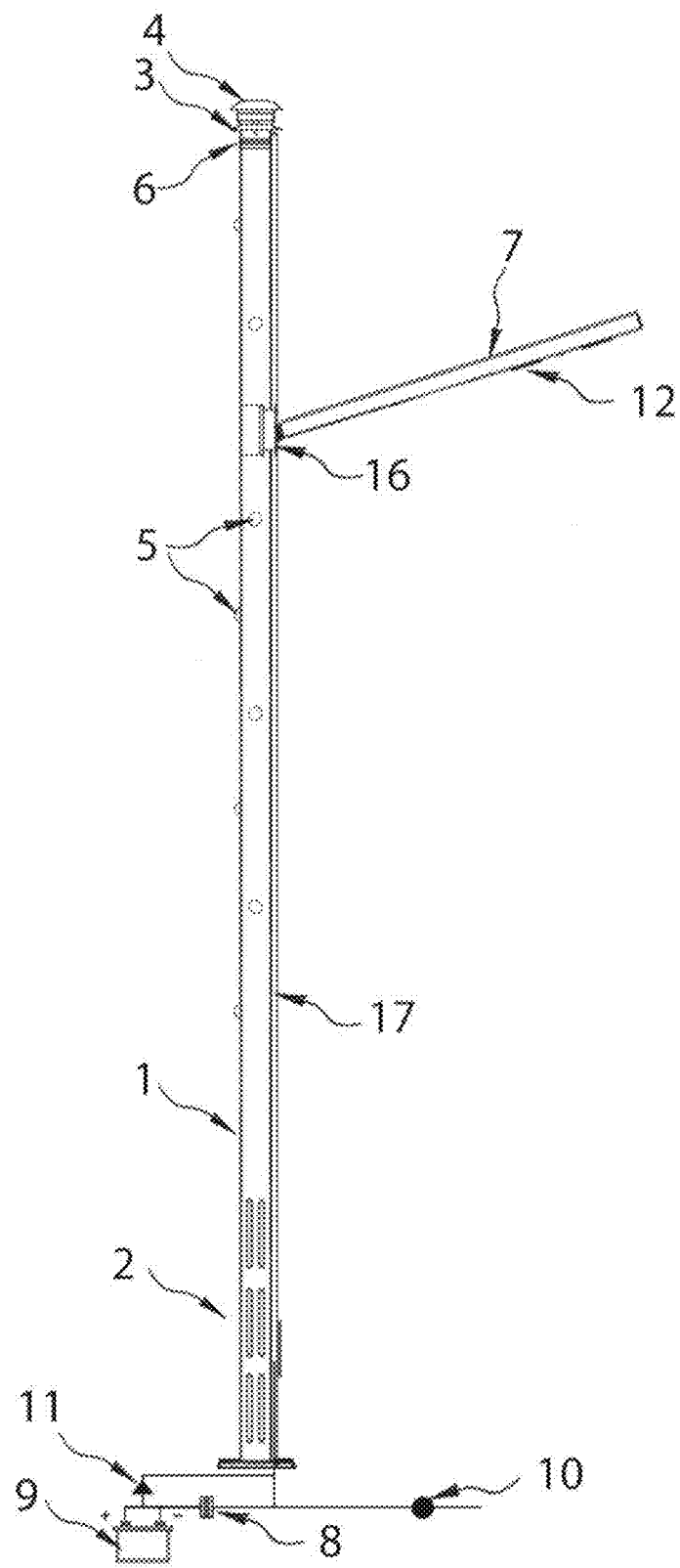
FIG. 1 is a side elevational view of a solar chimney street lighting pole according to the present invention.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Furthermore, the terms "approximately," "proximate," "minor," and similar terms generally refer to ranges that include the identified value within a margin of 20%, 10% or preferably 5% in certain embodiments, and any values therebetween.

Referring now to the drawings, wherein like reference numerals designate identical or corresponding parts throughout several views, the following description relates to a solar chimney street lighting pole.

Referring to FIG. 1, the solar chimney street lighting pole may include a pole 1 and a light fixture 12, arranged near one end of the pole 1. In some embodiments, one or more light fixtures 12 may be arranged on the light pole 1. The one or more light fixtures 12 may be arranged as branch units extending from the pole 1. The one or more light fixtures 12 may be mounted proximate to the pole 1 or may be mounted to a support that extends from the pole 1 so that light may reach an area that is away from the pole 1. For example, in some cases, a pole 1 may be positioned offset from a street, such that the street is located approximately 5 to 15 meters from the base of the pole 1. In such cases, the light fixture will need to extend out from the pole by way of a support so that the light fixture is proximate to or over the street.

The pole 1 may have a smooth circular profile and be of the same diameter all the way along the length of the pole. The length of the pole may vary based on the extent of lighting by a light source. The pole 1 is preferably of a length such that the extent of light from the light source at least partially overlaps the light from the light source of an adjacent pole 1. The length of the light pole 1 is preferably such that the number of poles in a given area is minimized, while a light source near a top of the pole may be reached by repair vehicles, or other repair equipment, in order to administer repairs. In some embodiments, the length of the pole 1 ranges from approximately 3 to 25 meters, preferably 4-12, or 5-8 meters.

The pole 1 may be made of reinforced concrete, metal, or fiber-reinforced polymer. The types of metal may include steel or aluminum. Although the pole 1 in FIG. 1 has a circular profile, the pole 1 may have any of a variety of cross-sections, including polygonal shapes of square, pentagon, hexagonal, to name a few. The outer diameter of a pole 1 of circular cross-section may range from approximately 10 centimeters to as much as 30 centimeters depending on the height, desired strength, and application. A pole with a square cross-section may have a side that ranges from approximately 10 centimeters to 30 centimeters. Also, although the pole 1 of FIG. 1 has the same diameter over its entire length, the pole 1 may alternatively have a slightly tapered cross-section that becomes smaller from one end to the opposite end of the pole 1 that contains the light fixture. The angle of tapering may be small, in the range of approximately 0.1 to 3 degrees in the lengthwise direction. In some environments, a tapered pole 1 may be more stable than a straight pole and may function to accelerate the upwards draft of polluted air. The pole 1 has a hollow interior in order to allow air to flow, as well as to reduce weight and cost of materials. Also, an electric cable may be arranged inside the hollow interior of the pole 1. The inner walls of the pole 1 may be made as smooth as possible to reduce wall friction when air moves inside.

The pole 1 has openings at or proximate to each of its ends. Openings may include one or more air inlets 2 proximate to the base and an air outlet 3 at the end having the light fixture. The air inlets 2 may be circular or oblong in shape; where an oblong shape may be a thin slot with rounded or squared ends. The air inlets 2 may be arranged circumferentially around the pole 1. It is preferred that the air inlets 2 be arranged proximate to the ground. It is preferred that the size of the air inlets 2 be large enough to allow air to flow, but not affect the structural integrity of the pole 1. In some embodiments in which the pole 1 has a circular cross-section, two or three slotted air inlets 2 may be arranged in the length direction of the pole, and odd number of sets of the slots may be arranged around the circumference of the pole 1 in order to ensure strength sufficient to avoid bending of the pole 1 due to the slots. The air outlet 3 may be the shape of the end of the pole 1. The air outlet 3 may be covered by a rain cap 4 to prevent rain water from getting inside the pole 1. The rain cap 4 may have a cone shape, a roof-like triangular shape, or a three or more sided pyramid to allow rain to drain off. It is preferred that the air outlet 3 be arranged at least three meters above the ground.

Figure 2:
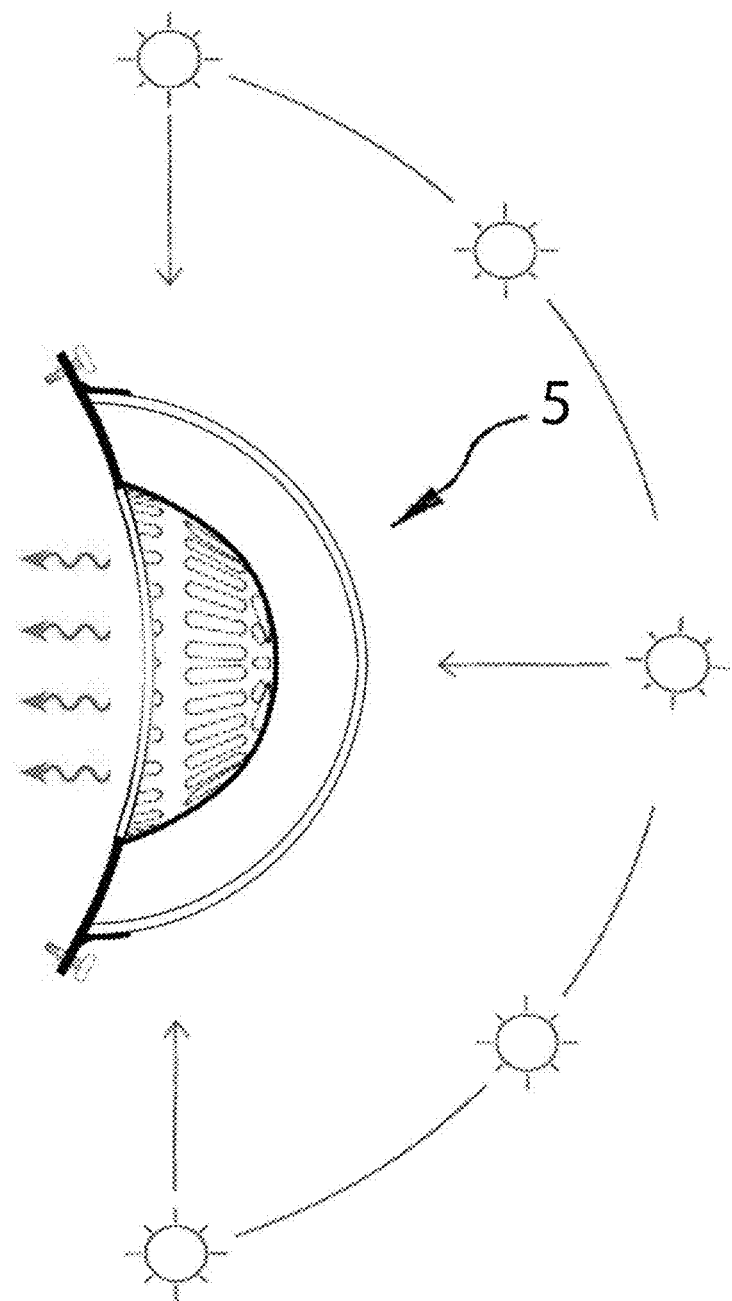
FIG. 2 is a top sectional view of a solar thermal collector dome.

The pole 1 preferably has many circular openings in its wall at different positions. Each opening may be covered with a solar thermal collector dome 5 that comprises high-impact tinted glass (or other transparent or opaque material) with high heat absorption properties. FIG. 2 is a partial view of a solar thermal collector dome 5. The diameter of the small circular opening containing a small thermal collector dome 5 may be approximately a quarter of the inner diameter of the pole 1, or in the case of pole 1 having a polygonal cross-section, is approximately half of the longest inner distance between vertices. The domes 5 may be evenly spaced along a length direction of the pole 1, and preferably are evenly distributed around the circumference of the pole 1. The domes 5 may have a smooth semi-spherical shape or may be formed of several flat glass plates (hexagonal in shape) that are interconnected into a semi-spherical shape. As can be seen in FIG. 2, due to the semi-spherical shape of the solar thermal collector dome 5, the dome can always collect the heat from the sun's rays without having to specify a pre-determined orientation or inclination. In some embodiments, the solar thermal collector dome 5 may instead be a lens having a focal length that ends in the interior of the pole 1. In one embodiment, the lens may heat air that flows through the pole 1. The lens may be a Fresnel lens that concentrates light and heat inside the pole 1.

The pole 1 may be configured to be vertically secured relative to the ground with the one end proximate to the ground, and the solar thermal collector domes 5 configured to heat air inside the hollow pole 1 using solar radiation, thereby creating an upward air stream. The air is heated by transferring heat collected by each solar thermal collector dome 5 to the inner space of the pole 1. When the air inside the pole 1 is heated, it becomes less dense and so it rises inside the pole 1 and exits from the air outlet 3. This will lower the air pressure in the lower portion of the pole which will cause more air from outside to enter through the air inlets 2. Such passive air movement guides away polluted air from a near-ground height where pedestrians are to an upper height away from them. The passive air movement can be accomplished by just a few modifications to existing aluminum or steel poles, including adding openings proximate to the bottom of the pole, a capped opening at the top of the pole, and several solar thermal collector domes at various positions along the length of the pole.

Figure 3:
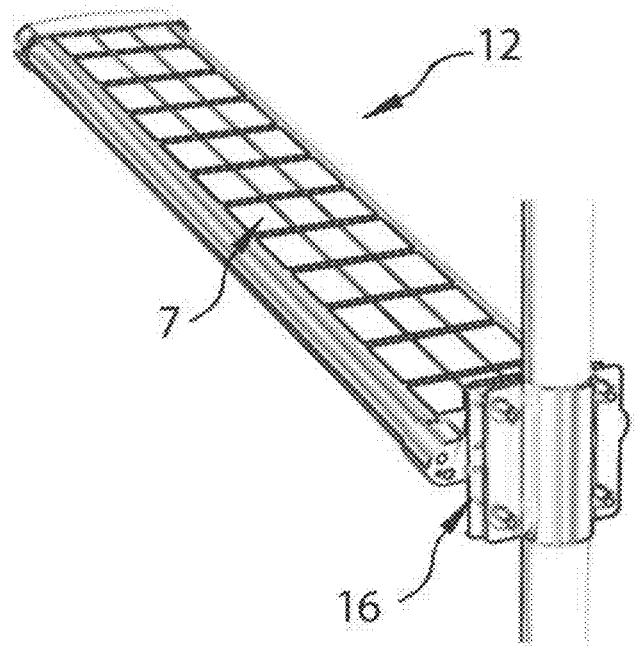
FIG. 3 is a top, perspective view of the solar panel attached to the top surface of the light fixture.
Figure 4:
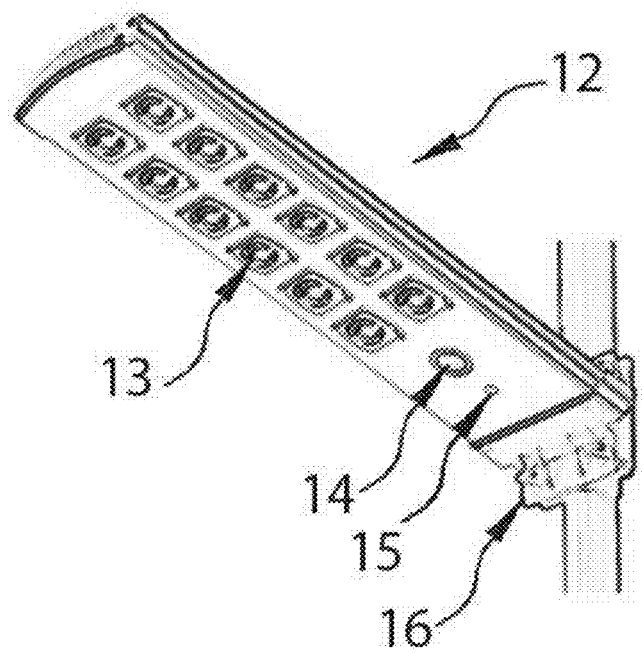
FIG. 4 is a bottom, perspective view of the LED light fixture.

FIG. 3 is a top, perspective view of a solar panel attached to the top surface of the light fixture. The solar panel 7 may be arranged on a surface of the light fixture 12, which branches from the pole 1. In some embodiments, the solar panel 7 may be secured on a surface of the pole 1. FIG. 4 is a bottom, perspective view of the light fixture. The light fixture 12 includes a light source. As best seen in FIG. 4, the light fixture 12 may be a LED light unit that consists of one or more LED lamps 13, a light detector sensor 14 (one or more light sensitive photocells) and a passive infrared (PIR) motion sensor 15. Although the light detector sensor 14 is shown as being located on a side of the light fixture 12 that contains the light source, the light detector sensor 14 may be located at other positions, such as at an end, along a side, or on top of the light fixture 12. Also, the light detector sensor 14 may optionally be located on a side of the pole 1, or at some remote location. In addition, there may be more than one light detector sensor 14. Alternatively, the light detector sensor may be a photoresistor, which when ambient light falls on the photoresistor, the light source may be turned off. The sensitivity of the light detector sensor may be that of the human eye, in which case darkness may be detected at approximately 100FC. In a similar manner, although the motion sensor 15 is shown as being located on a side of the light fixture 12 that contains the light source, the motion sensor 15 may be located at alternative positions or remotely from the pole 1. It is preferred that the motion sensor 15 have a range of approximately 160 degrees and be able to detect motion at a distance of greater than the length of the pole 1.

In some embodiments, the light fixture has a substantially rectangular end that is attached to the pole 1. The light fixture 12 has a mounting accessory 16 for fixing the light fixture 12 to the pole 1. In some embodiments, the mounting accessory 16 may include a clamp in which two parts together surround the pole 1. The two parts of the clamp may have a shape that matches the outer cross-section shape of the pole 1. For example, if the pole 1 has a circular cross section, the shape of the parts of the clamp may include sections that together form a circle that is approximately the same diameter as the outer diameter of the pole 1. If the pole 1 has a square cross section, the clamp may include sections that together form a square that has approximately the same dimensions as the pole cross section. The two parts of the clamp may be secured to each other by two or more bolts or similar hardware. One of the parts of the clamp may include an attachment portion that projects from the clamp and has a shape that substantially matches the shape of the end of the light fixture 12 in order to hold the light fixture 12. It should be understood that other types of mounting accessories 16 may be used to hold the light fixture 12 in place along the pole 1. For example, the light fixture 12 may be directly secured to the pole 1 by a bar or post that protrudes from an end of the light fixture 12. The bar or post may be inserted into an opening in a side of the pole 1. As another example, an L-shaped bracket or tapered elliptical bracket may be mounted to the pole 1 and the light fixture 12 may be mounted to an extended side of the L-shaped bracket or tapered bracket. The length of the L-shaped bracket or tapered bracket extending from the pole may differ due to amount of reach required by an application. For example, a street lamp application may require that the pole be located a certain distance away from an area where light is to be projected. The length of the L-shaped bracket or tapered bracket may have to reach several meters from the side of the pole.

In some embodiments, the light fixture 12 may be a self-contained unit in which the solar panel 7 supplies electricity to the light source, which is driven based on signals from the light sensor 14 and motion sensor 15. The self-contained unit may include control circuitry that regulates the light source 13 based on the signals from the light sensor 14 and motion sensor 15.

Because the passive air movement is provided by way of heat from sunlight, air movement may not occur when the amount of sunlight is below a certain level. In some embodiments, air flow may be maintained in periods of reduced or no sunlight by using an exhaust fan 6. In order to operate the fan with minimum power from an external source such as public electricity, the solar chimney street lighting pole may include a photovoltaic system and an exhaust fan 6. The exhaust fan 6 may be placed at the end of the pole 1 proximate to the air outlet 3 to exhausts air from the pole 1 to the outside. The exhaust fan 6 may be powered by the electricity provided by the photovoltaic system. The exhaust fan 6 includes a motor-actuator that rotates the fan.

Figure 5:
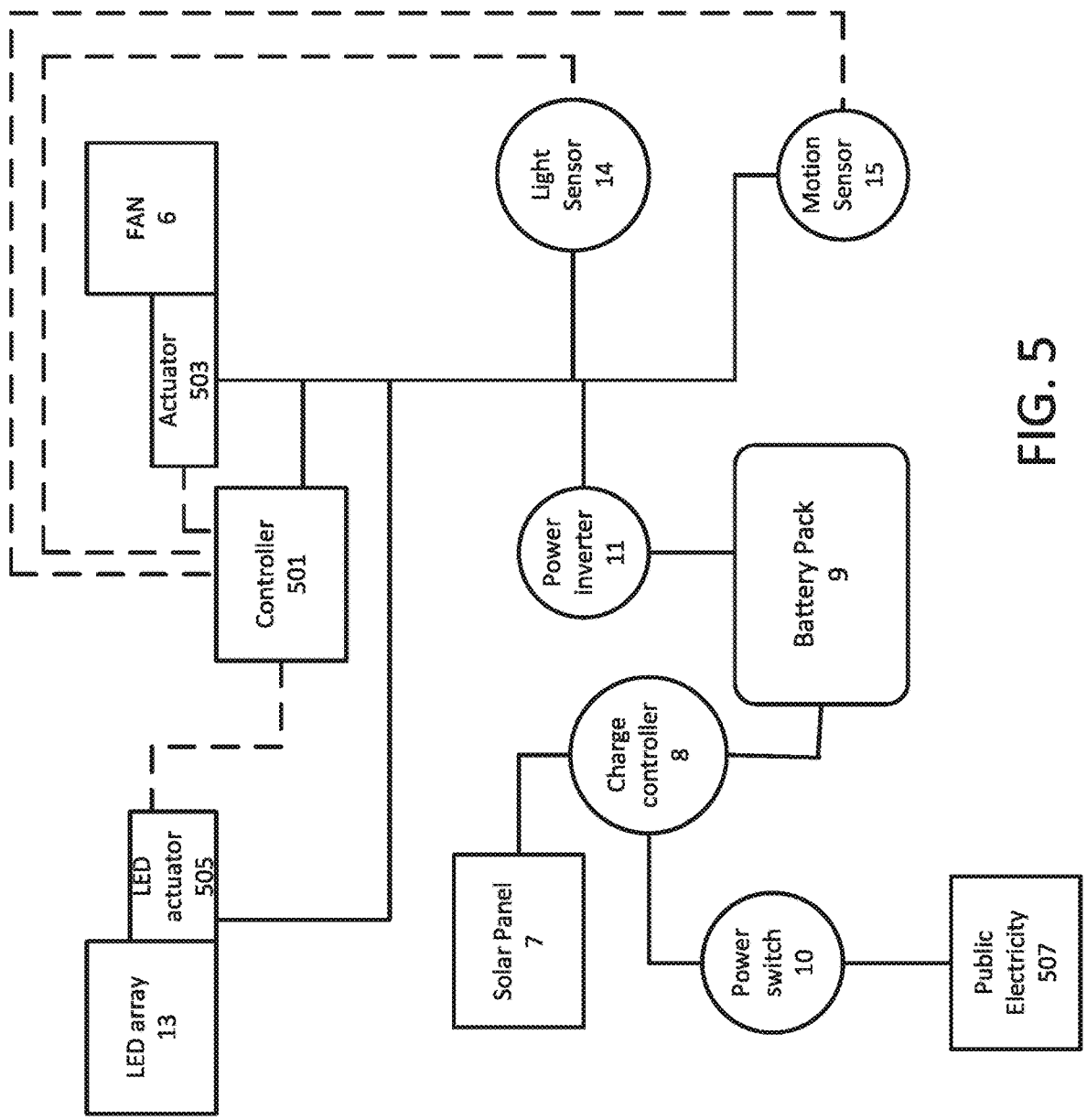
FIG. 5 is a block diagram of electrical circuitry for the solar chimney street lighting pole.

FIG. 5 is a block diagram of a control system for the solar chimney street lighting pole. In the figure, solid lines denote electrical connections and dotted lines denote paths for control signals. The solar panel 7 absorbs and converts sunlight into electricity in a photovoltaic system. The photovoltaic system is a power system designed to supply usable solar power by means of photovoltaics. The photovoltaic system may consist of an arrangement of several components, including the solar panel 7, a solar charge controller 8 to regulate the amount of current the solar panel 7 feeds into a rechargeable battery bank 9, a power switch 10 to control (open/close) a circuit of the public electricity 507 as needed and a power inverter 11 that takes DC voltage from battery pack 9 and turns it into AC voltage which is used to run the exhaust fan 6 via the exhaust fan actuator 503 and the LED lamp array 13 via a LED actuator 505. Also, sensors, such as light sensor 14 and motion sensor 15 may take power from the battery pack 9.

In one embodiment, the controller 501 may control the light source based on signals from the motion sensor and the light sensor. Regarding FIG. 5, a controller 501 may send a control signal to the LED actuator 505 to switch the LED lamps 13 based on the solar light illuminance detected by the light detector sensor 14. In addition, the controller 501 may send a control signal to the LED actuator 505 to switch the LED lamps 13 based on motion detected by the motion detection sensor 15. In some embodiments, the LED lamps 13 may be controlled by the controller 501 to automatically turn on whenever illuminance detected by the light detector sensor 14 is below a certain level. In some embodiments, the LED lamps 13 may be turned on only when the light detector sensor detects illuminance below a certain level and the motion detector 15 detects motion.

In one embodiment, the controller may control the fan actuator 503 based on solar light illuminance detected by the light detector 14. The approximate level of air flow that would be necessary to mitigate polluted air from a street level and through the pole 1 is at least 100 m³/h. Depending on temperatures achieved inside the pole 1 due to heating by sunlight, the approximate range of air flow is 100-900 m³/h. Control by the controller 501 may be such that when the solar light illuminance is detected below a certain level at which the domes may not have sufficient sunlight to heat the air in the pole 1, the controller 501 may send a command to the fan actuator 503 to operate the fan 6 in order to maintain air flow above 100 m³/h. In an alternative embodiment, the controller 501 may receive sensor information from a temperature sensor located inside of the pole 1, and may send a command to the fan actuator 503 to operate the fan 6 when the temperature inside the pole 1 drops below a certain temperature. In some embodiments, a pair of temperature sensors may be located at different positions along the length and inside of the pole 1, and the controller 501 may use the pair of temperature sensors to detect a temperature differential. In such case, the fan 6 may be operated when the temperature differential is below a predetermined temperature difference. In still a further embodiment, the controller 501 may receive sensor information from an air flowrate sensor such that when the flowrate of air inside the pole 1 drops below approximately 100 m³/h, the controller 501 sends a command to the fan actuator 503 to operate the fan 6. In each of these alternative embodiments, the controller 501 may delay sending a command to the fan actuator 503 by a period of time set in the controller. In such case, a control command may only be sent if the temperature or air flowrate drops below a certain amount for a predetermined period of time. The predetermined period of time may be set in order to avoid frequent starting and stopping the fan 6 due to temporary fluctuations in air temperature or flowrate. The predetermined period of time may range from approximately 10 seconds to a 2 or 3 minutes. The appropriate temperature, temperature differential, or flowrate depend on factors, including the length and inner diameter/dimensions of the pole 1, ambient temperature, pressure, and humidity of air outside of the pole 1.

In one embodiment, the solar chimney street lighting pole also may include a thermal insulated conduit 17 for the electricity cable so that it is not affected by the hot air updraft. It is preferable that the conduit be constructed of non-metallic materials such as Polyvinyl chloride (PVC) or High-density polyethylene (HDPE).

Figure 6:
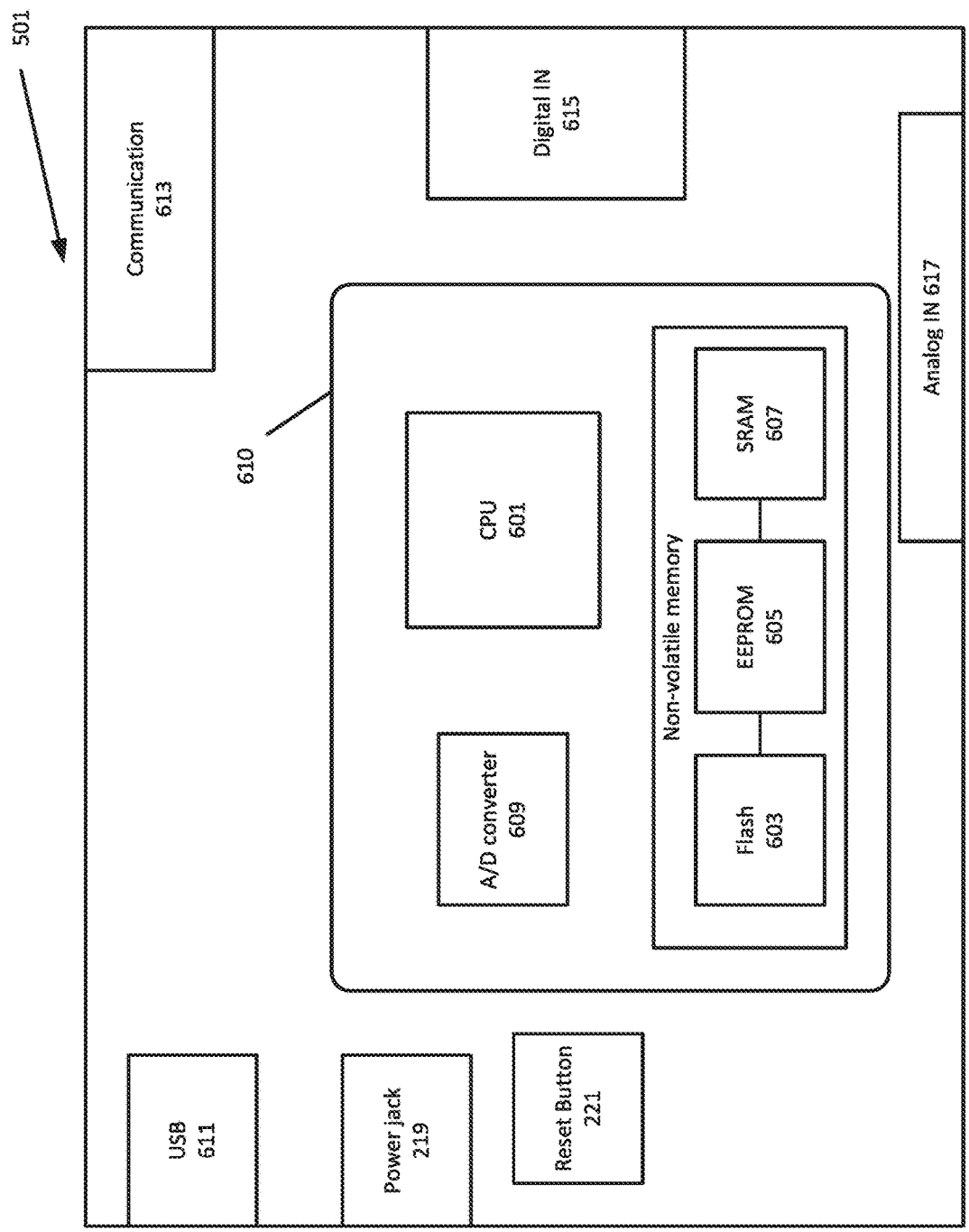
FIG. 6 is a block diagram for a control system for the solar chimney street lighting pole.

The computer-based control system 501 may be based on a microcontroller. FIG. 6 is a block diagram for a control system for the solar chimney street lighting pole. A microcontroller may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, the computer-based system 501 is an integrated circuit board 101 with a microcontroller 610. The board includes digital I/O pins 615, analog inputs 617, hardware serial ports 613, a USB connection 611, a power jack 619, and a reset button 621. Variations in microcontroller arrangement may include the number of pins, whether or not the board includes communication ports or a reset button.

In one embodiment, the microcontroller may be an 8-bit RISC-based microcontroller having 256 KB flash memory 603, 8K SRAM 607, 4K EEPROM 605, 86 general purpose I/O lines, 32 general purpose registers, a real time counter, six flexible timer/counters, a 16-channel 10-bit A/D converter 609, and a JTAG interface for on-chip debugging. This microcontroller is a single SOC that achieves a throughput of 16 MIPS at 16 MHz and operates between 4.5 to 5.5 volts. The recommended input voltage is between 7-12V. Although this description is of a particular microcontroller product, it should be understood that other microcontrollers may be used. Microcontrollers may vary based on the number of processing cores, size of non-volatile memory, the size of data memory, as well as whether or not it includes an A/D converter or D/A converter.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

It is to be understood that the present invention is not limited to the embodiments described above, but encompasses any and all embodiments within the scope of the following claims.

What is claimed is:

1. A solar chimney street lighting pole comprising:
    a hollow pole with a first end and a second end and circular openings evenly spaced along a length direction of the pole, wherein an air inlet is circumferentially arranged at the first end and an air outlet is arranged at the second end;
    a light fixture mounted proximal to the second end;
    a plurality of dome-like solar heaters arranged on a surface and over said circular openings;
    a fan arranged inside the hollow pole and proximal to the air outlet, wherein the fan is configured to create an upward air stream;
    a fan actuator configured to switch the fan;
    a sensor for indicating solar radiation; and
    a controller electrically connected to the sensor and the fan actuator, wherein the controller configured to command the fan actuator to switch the fan based on the indication of solar radiation by the sensor,
    wherein the hollow pole is configured to be vertically secured relative to the ground with the first end proximal to the ground, and the dome-like solar heaters configured to passively heat air inside the hollow pole using solar radiation and create an upward air stream therein,
    wherein the controller is configured to command the fan actuator to switch the fan when the air flowrate of the passively heated air inside the hollow pole is below a predetermined flowrate, and
    wherein the solar chimney street lighting pole is configured to transport a polluted air proximal to the ground to a point with an elevation of at least 3 meters relative to the ground.

2. The solar chimney street lighting pole of claim 1, further comprising:
    an electric circuit comprising
        a photovoltaic cell secured on a surface of the hollow pole or a surface of a branch unit attached to the hollow pole, wherein the photovoltaic cell configured to generate a voltage from solar radiation, and
        a rechargeable battery configured to store the voltage generated in the photovoltaic cell; and
    wherein the fan is configured to create an upward air stream in the absence of solar radiation using the voltage stored in the rechargeable battery.

3. The solar chimney street lighting pole of claim 2, wherein the sensor is a photocell configured to measure a solar light illuminance,
    wherein the controller is electrically connected to the photocell and the fan actuator, and
    wherein the controller is configured to command the fan actuator to switch the fan based on the solar light illuminance.

4. The solar chimney street lighting pole of claim 2, wherein the sensor is a temperature sensor configured to measure a temperature of air inside the hollow pole, wherein the controller electrically connected to the temperature sensor and the fan actuator, and wherein the controller is configured to command the fan actuator to switch the fan based on the temperature of the air measured by the temperature sensor.

5. The solar chimney street lighting pole of claim 4, wherein the controller is configured to command the fan actuator to switch the fan based on the temperature of the air inside the hollow pole being below a predetermined temperature for a predetermined period of time.

6. The solar chimney street lighting pole of claim 2, wherein the sensor is an air flowrate sensor configured to measure a flowrate of air inside the hollow pole, wherein the controller is electrically connected to the air flowrate sensor and the fan actuator, and wherein the controller is configured to command the fan actuator to switch the fan based on the flowrate measured by the air flowrate sensor.

7. The solar chimney street lighting pole of claim 6, wherein the controller is configured to command the fan actuator to switch the fan based on the air flowrate of the air inside the hollow pole being below the predetermined flowrate for a predetermined period of time.

8. The solar chimney street lighting pole of claim 3, wherein the photovoltaic cell is secured on a surface of the branch unit attached to the hollow pole, wherein the light fixture comprises:

a plurality of LED lamps arranged on the surface of the branch unit; and an LED actuator electrically connected to the controller and configured to switch the LED lamps, wherein the controller configured to command the LED actuator to switch the LED lamps based on the solar light illuminance.

9. The solar chimney street lighting pole of claim 8, further comprising:

a motion sensor electrically connected to the controller and configured to detect a motion proximal to the solar chimney street lighting pole, wherein the controller configured to command the LED actuator to switch the LED lamps based on the motion.

10. The solar chimney street lighting pole of claim 1, wherein the dome-like heaters passively heat air inside the hollow pole and create an upward air stream of at least 100 $m^3/h$.

11. The solar chimney street lighting pole of claim 1, wherein the air inlet includes a plurality of rows of vertically elongated inlets evenly spaced around the circumference of the hollow pole.

* * * * *